United States Patent

Iino

[11] Patent Number: 5,335,223
[45] Date of Patent: Aug. 2, 1994

[54] POINTER PROCESSING CIRCUIT IN SONET SYSTEM

[75] Inventor: Hatsumi Iino, Kawasaki, Japan

[73] Assignee: Fujitsu Limited, Kawasaki, Japan

[21] Appl. No.: 998,571

[22] Filed: Dec. 18, 1992

[30] Foreign Application Priority Data

Dec. 18, 1991 [JP] Japan .................. 3-333764

[51] Int. Cl.[5] .................. H04L 12/58
[52] U.S. Cl. .................. 370/65.5; 370/84; 370/108
[58] Field of Search .......... 370/58.1, 65.5, 84, 370/100.1, 105.1, 105.3, 105.4, 108; 375/106, 111, 114, 118, 119

[56] References Cited

U.S. PATENT DOCUMENTS

| | | | |
|---|---|---|---|
| 4,596,026 | 6/1986 | Cease et al. | 370/108 |
| 4,855,999 | 8/1989 | Chao | 370/84 |
| 4,967,405 | 10/1990 | Upp et al. | 370/84 |
| 4,967,410 | 10/1990 | Takase et al. | 370/108 |
| 5,142,529 | 8/1992 | Parruck et al. | 370/84 |

FOREIGN PATENT DOCUMENTS

63-60636   3/1988   Japan.
3-183225   8/1991   Japan.
4-78240    3/1992   Japan.

*Primary Examiner*—Benedict V. Safourek

[57] ABSTRACT

A pointer processing circuit which is incorporated in a SONET transmission apparatus having a cross connect equipment, is installed in the reception part of the cross connect equipment. The pointer processing circuit detects a phase difference between a multiplexed input frame signal for each input side transmission line, and receives a frame synchronous signal by which output frame signals are commonly synchronized. The frame synchronous signal is produced by a frame counter connected to the pointer processing circuit. The pointer processing circuit has a unit for adjusting a pointer value of the multiplexed input frame signal, based on the thus detected phase difference, before the cross connection of the input frame signals.

8 Claims, 12 Drawing Sheets

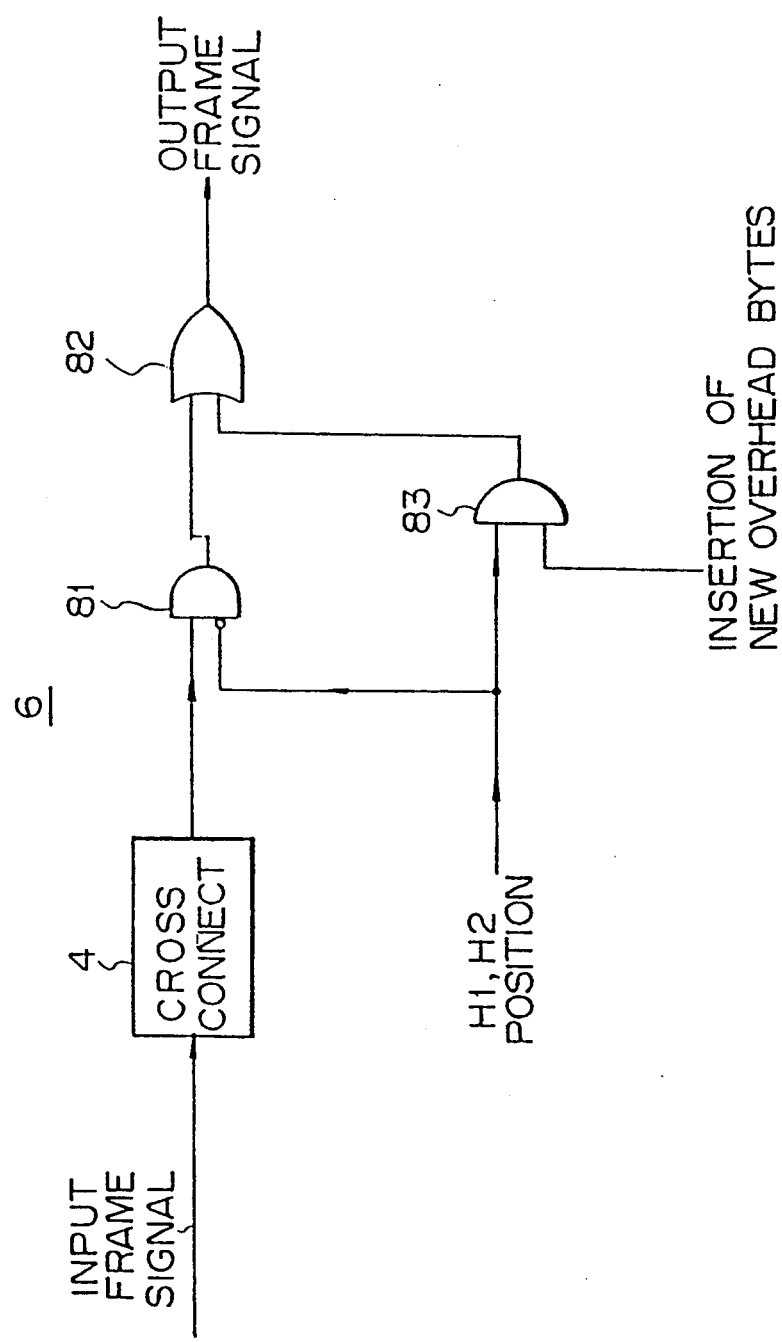

POINTER PROCESSING CIRCUIT IN SONET SYSTEM

BACKGROUND OF THE INVENTION

Field of the Invention

The present invention relates to a pointer processing circuit which is suitably adopted to a transmission apparatus operated in a digital transport network called a Synchronous Digital Hierarchy (SDH), i.e., particularly called a Synchronous Optical Network (SONET) in North America.

Generally, in a transmission apparatus incorporating therein a cross connect equipment employed in the SONET communication system, a phase matching of transmission signals is achieved by the use of respective pointer values. In this case, it is desired to easily achieve the pointer value processing for the pointer values of the multiplexed input frame signals given from not only a single input transmission line but also a plurality of input transmission lines.

Description of the Related Art

As will be explained in detail hereinafter, in a transmission apparatus having a prior art pointer processing circuit, there is no difficulty in achieving the pointer processing for the pointer values of the transmission frame signals passing through the cross connect equipment, if the signals are received from not a plurality of input side transmission lines but from a single input side transmission line. This is because, if the cross connect equipment receives the multiplexed input frame signals from not the plurality of input side transmission lines but from the single input side transmission line as mentioned above, the cross connect equipment receives the multiplexed input frame signals having the same reception phase, and therefor, it is adequate for the pointer processing circuit to merely deal with a phase difference between the reception phase and the transmission phase of the output frame signals, which transmission phase is determined by the related transmission apparatus itself and is common to all the output frame signals.

Contrary to the above, if the cross connect equipment receives the multiplexed input frame signal of not the single input side transmission line but the plurality of input side transmission lines, there is difficulty in achieving the pointer processing for the pointer values of the transmission frame signals passing through the cross connect equipment. This is because, in the above case, the cross connect equipment receives the multiplexed input frame signals from one input side transmission line and, at the same time, receives the multiplexed input frame signals from other input side transmission lines, in which the reception phase of the former signals is usually not the same as the reception phase of the later signals. Therefore, the pointer processing for the cross connected output frame signals, after applying time slot exchange operations and multiplexing operations to the multiplexed input frame signals in the cross connect equipment, becomes complicated, since the pointer processing equipment must discriminate, at the output side of the cross connect equipment, from which input side transmission line each cross connected frame signal has been input to the cross connect equipment to detect the phase difference between the phase of each cross connected transmission frame signal and the aforesaid transmission phase common to all the output transmission frame signals, and thereafter the respective pointer values are rewritten based on the thus detected phase difference.

SUMMARY OF THE INVENTION

Therefore, the present invention, in view of the above problem, has as its object the provision of a pointer processing circuit in a SONET system which can easily achieve a pointer processing of the pointer values of the transmission frame signals passing through the cross connect equipment even in a case where transmission frame signals are supplied from a plurality of input side transmission lines.

To attain the above object, in the present invention, the pointer processing circuit is installed in the reception part of the cross connect equipment. Namely, the pointer processing is achieved for every multiplexed input transmission signal before the cross connection. This avoids the aforesaid complicated pointer processing which is caused if the pointer processing is achieved for every frame signal after the cross connection as in the prior art pointer processing circuit.

BRIEF DESCRIPTION OF THE DRAWINGS

The above object and features of the present invention will be more apparent from the following description of the preferred embodiments with reference to the accompanying drawings, wherein:

FIG. 11 illustrates an embodiment of the frame former of FIG. 5.

DESCRIPTION OF THE PREFERRED EMBODIMENTS

Before describing the embodiments of the present invention, the prior art and the problems therein will be first described with reference to the related figures.

Figure 1:
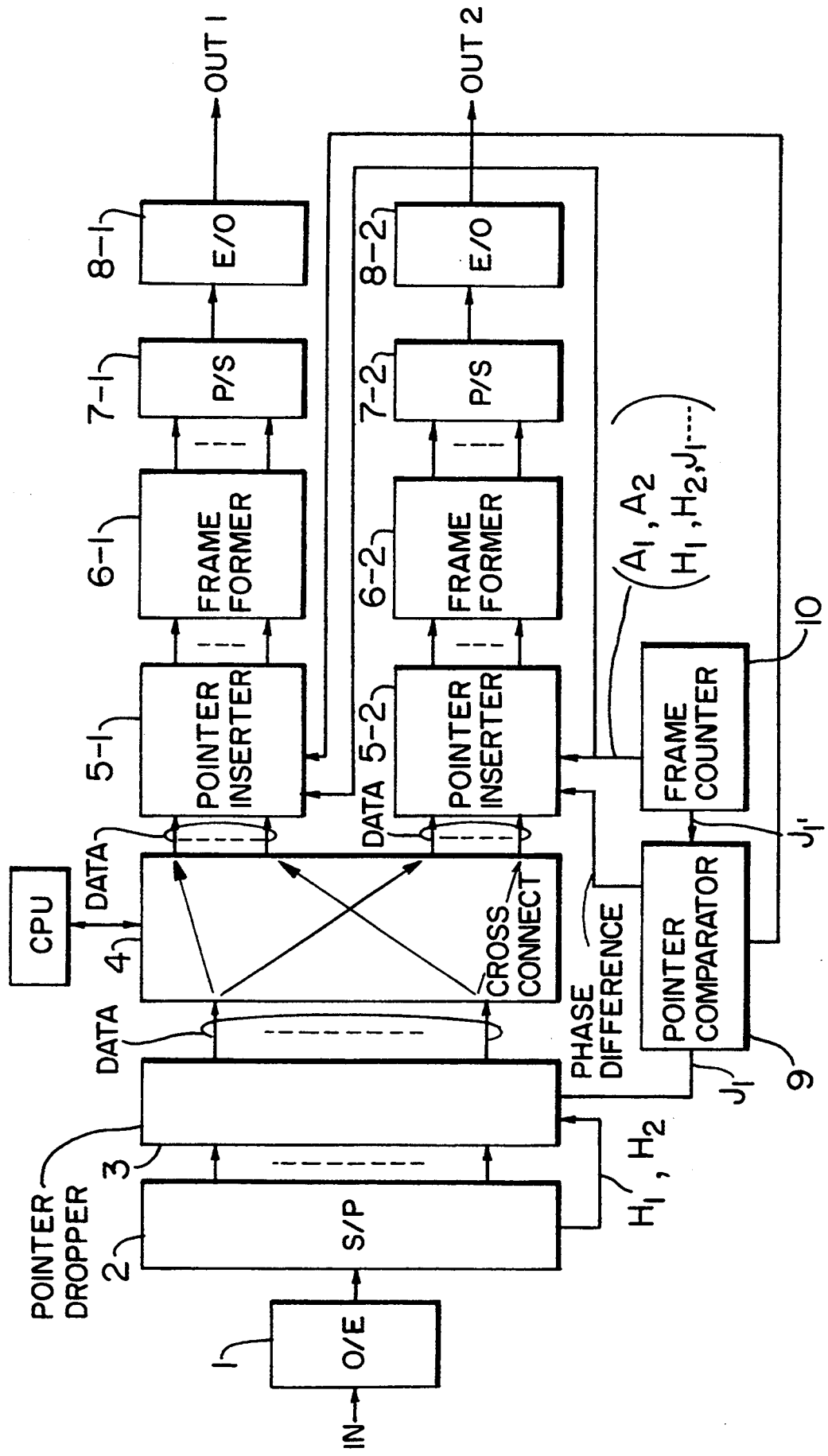
FIG. 1 illustrates a block diagram of a transmission apparatus of a SONET system including a prior art pointer processing circuit.

FIG. 1 illustrates a block diagram of a transmission apparatus of a SONET system including a prior art pointer processing circuit. In recent years, large capacity optical transmission, such as OC-1 (51.84 Mbps), OC-3 (155.52 Mbps), OC-12 (622.08 Mbps) and OC-48

(2488.32 Mbps) as a main line route, has been put into practice while taking worldwide standardization into account, under the SDH system which is substantially identical to the SONET system now being put into practice in North America.

The transmission apparatus of FIG. 1 is adopted to the SONET system, which transmission apparatus includes therein a cross connect equipment 4 controlled by a Central Processing Unit (CPU). The prior art pointer processing circuit is comprised of pointer inserting units 5-1 and 5-2 (in this example there are two pointer inserting units), a pointer dropping unit 3, a pointer comparating unit 9 which receives, on one hand, a signal indicative of a position "J1" from the pointer dropping unit 3 and, on the other hand, a frame synchronous signal (J1') from a frame counter 10. The pointer inserting units 5-1 and 5-2 rewrite respective pointer values based on the phase difference output from the pointer comparating unit 9. The transmission frame signal passing through the cross connect equipment will be explained below.

Figure 2A:
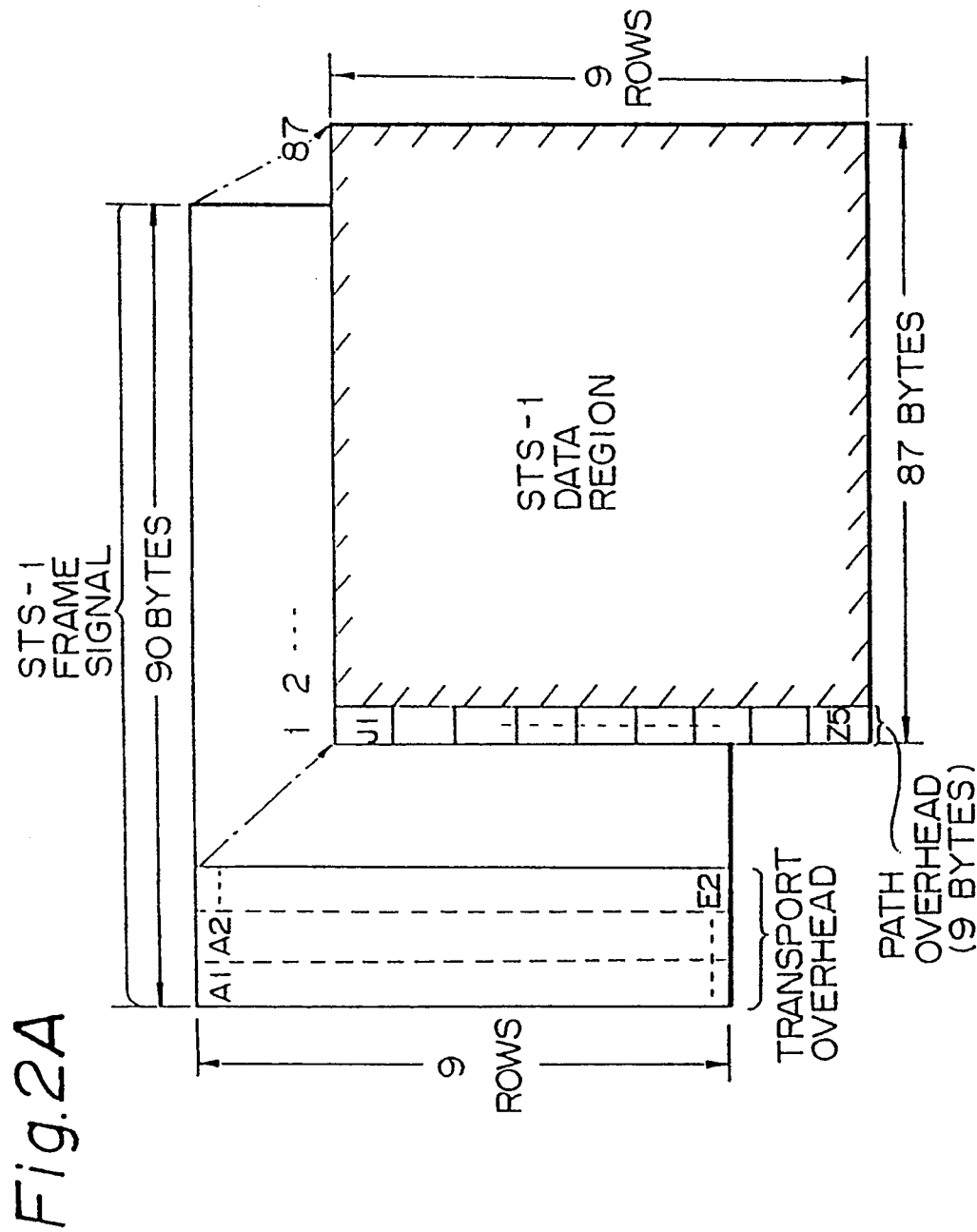
FIG. 2A schematically depicts a frame construction of an STS-1 signal used in a SONET system.
Figure 2C:
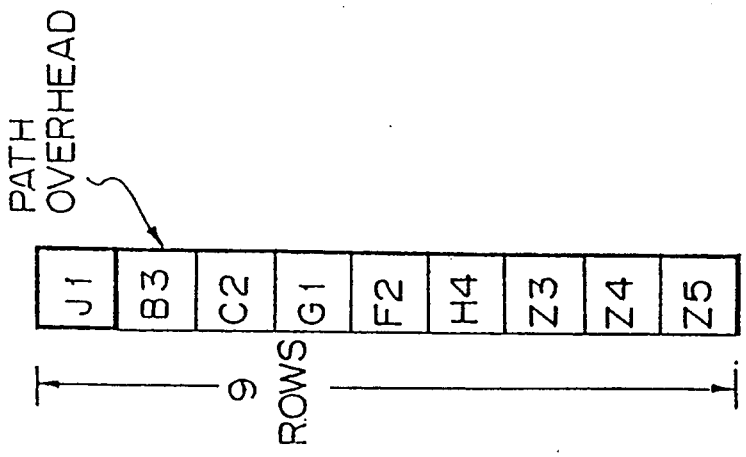
FIG. 2C depicts a detailed path overhead region of the STS-1 frame signal shown in FIG. 2A.
Figure 2B:
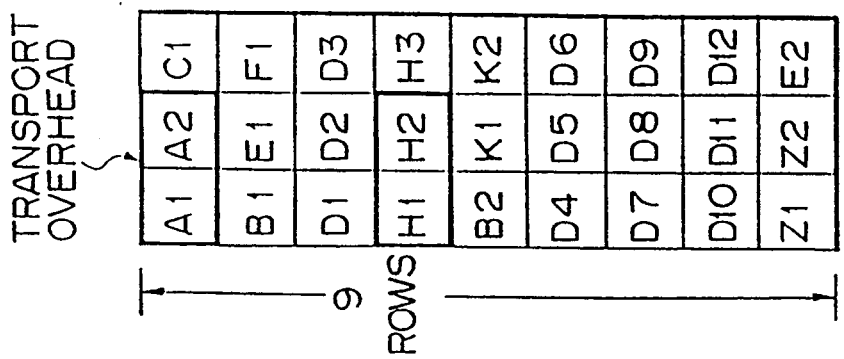
FIG. 2B depicts a detailed transport overhead region of the STS-1 frame signal shown in FIG. 2A.

FIG. 2A schematically depicts a frame construction of the STS-1 signal used in a SONET system, FIG. 2B depicts a detailed transport overhead region of the STS-1 frame signal shown in FIG. 2A, and FIG. 2C depicts a detailed path overhead region of the STS-1 frame signal shown in FIG. 2A. In a SONET system, both data information and control information are set up as a frame. Referring to FIG. 2A, STS-1 (Synchronous Transport Signal-level 51.84 Mbps) frame construction is depicted, wherein a data region is partially extended. The STS-1 frame signal is an electrical signal which is equivalent to an OC-1 (Optical Carrier-1) signal which is an optical signal. The OC-1 (OC-3, OC-12 ...) signal exists, in FIG. 1, at the left of the drawing, marked as "IN". Taking the OC-1 signal as an example, the corresponding STS-1 frame signal has a format of 9 rows (bytes)×90 columns (bytes) per each frame. The left three columns with nine respective rows (bytes) constitute a transport overhead region (see "TRANSPORT OVERHEAD" in FIG. 2A). The remaining 87 columns (bytes) with nine respective rows (bytes) constitute a data region, i.e., a payload conveying the aforesaid data information. In actuality, the STS-1 frame signal is transferred byte by byte and row by row sequentially from the top left byte to the bottom right byte. The STS-1 frame signal exists at the output of an optical/electrical converting unit (O/E) 1 shown in FIG. 1 and onward. In the region of 87 columns (bytes)×9 rows (bytes), a path overhead of a single column is included.

Referring to FIG. 2B, in the transport overhead, a variety of bytes are included which are called A1, A2 ..., H1, H2, H3 ... and so on. The bytes A1 and A2 are frame bytes. The frame bytes A1 and A2 are disposed at the top left two bytes of each frame at all times and used for performing a frame synchronization of channels.

The bytes H1 and H2 as a whole are called a pointer. The present invention is greatly concerned with the pointer (H1, H2). It is con, non that the pointer bytes H1 and H2 are disposed, in each transport overhead, at a position having a fixed positional relationship, at all times, relative to the position where the frame bytes A1 and A2 are disposed in the same transport overhead.

The pointer bytes H1 and H2 contain a pointer value. The pointer value represents a distance (D) or the number of time slots from a byte H3 to the byte J1 which indicates a head position of the data region (see "STS-1 DATA REGION" in FIG. 2A). The above distance D will be clarified in FIG. 3 explained hereinafter.

The byte H3 is used as a stuff byte. Namely, if the transmission frequency of the frame signal reduces slightly, a predetermined number of the data bytes cannot be accommodated in the frame signal. In this case, the stuff byte H3 is used to fill in the shortage of the data bytes. Contrary to the above, if the transmission frequency of the frame signal slightly increases, the number of the data bytes increases over a predetermined number of the data bytes. In this case, such a surplus data byte replaces the stuff byte H3.

In the three column transport overhead (FIG. 2B), the remaining control bytes, such as C1, B1 ... D3, B2, K1 ... D4 ... D12, Z1 ... and E2, have their own function. For example, the bytes B1 and B2 are used for indicating bit errors. The bytes D1, D2 ... D9 are used for forming a private line of a data communication serving company (carrier). The bytes Z1 ... E2 are unused bytes at the present time.

Referring to FIG. 2C, the path overhead for each data frame is composed of nine control bytes J1, B3 ... Z5. Among these bytes, the byte J1 is particularly relevant to the present invention. Namely, the byte J1 is specified by the aforesaid pointer bytes H1 and H2 to indicate the head position of the data frame. Usually, information for indicating an origination of a call is written in the byte J1. The remaining bytes B3 ... Z5 are not so relevant to the present invention, but are described in the Regulation of TR253 by Bellcore.

Figure 3:
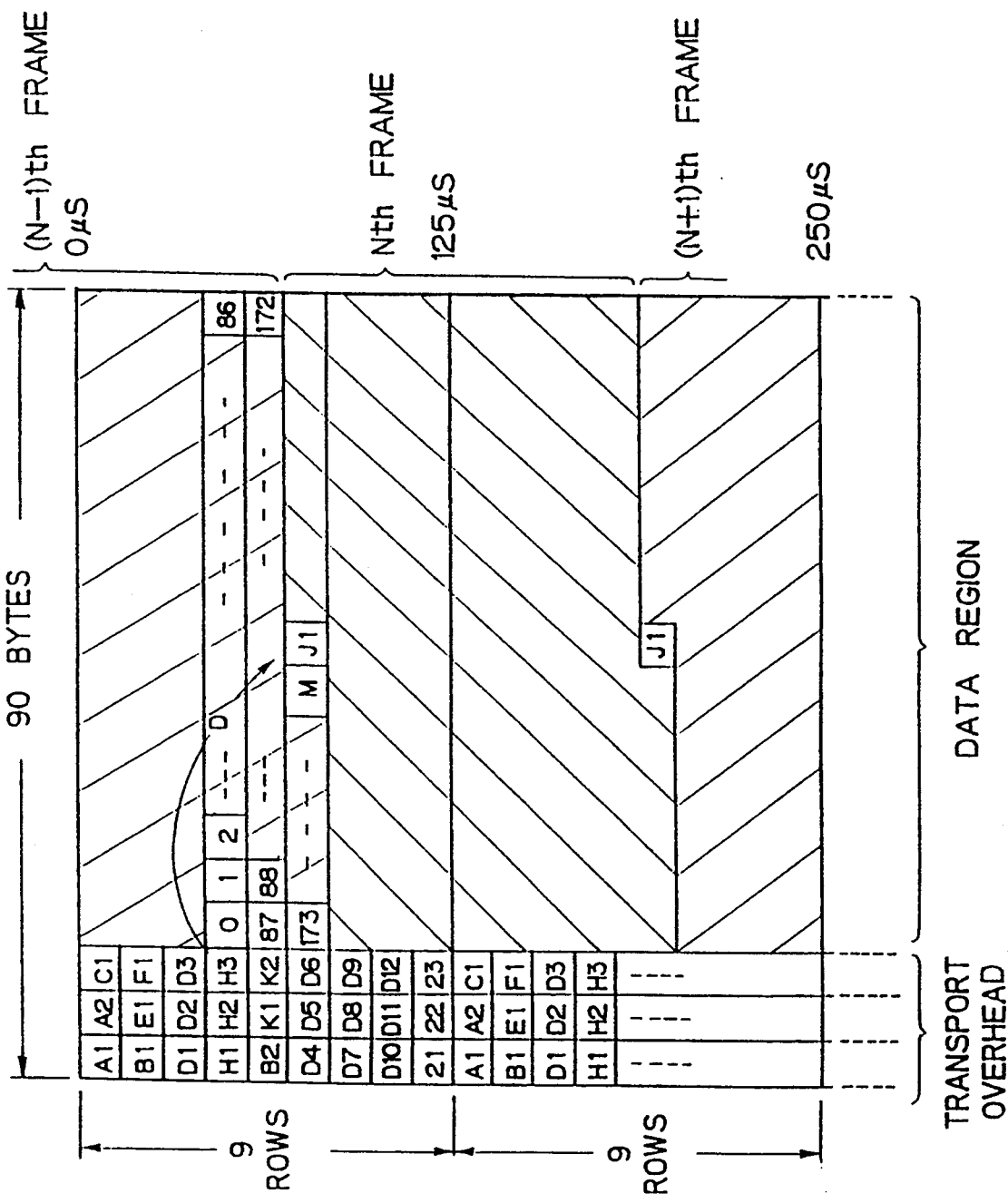
FIG. 3 depicts an example of an actual frame format.

FIG. 3 depicts an example of an actual frame format. As seen from FIG. 3, the transport overhead region is regularly aligned, but the data region is not regularly aligned due to many factors such as variations in transmission frequency, variations in transmission delay and so on. In the example, the byte J1 of Nth frame signal (also (N+1)th frame signal) is positioned as shown in FIG. 3, and therefore, the data region of the Nth frame signal starts right after the byte J1.

Referring again to FIG. 1 as well as FIGS. 2A, 2B, 2C and 3, assuming that an optical multiplexed frame signal (OC-1) "IN" is applied to the optical/electrical converting unit (O/E) 1 to become a corresponding electrical signal (STS-1), the electrical signal (STS-1) is then preferably applied to a serial/parallel converting unit (S/P) 2. In the S/P unit 2, frame synchronization is performed first for each channel by the use of the aforesaid frame bytes A1 and A2, and thereafter, the multiplexed input frame signal is demultiplexed. During the above frame synchronization, the frame bytes A1 and A2 are necessarily found, and therefore, the pointer bytes H1 and H2 are automatically extracted, since the pointer bytes H1 and H2 are disposed at a position having a fixed positional relationship relative to the position of the frame bytes A1 and A2 as mentioned earlier. The thus extracted pointer bytes H1 and H2 are shown as "H1, H2" in FIG. 1.

The output from the serial/parallel converting unit 2 is then applied to the pointer dropping unit 3 by which the aforesaid byte J1 is taken out, J1 having been specified by the pointer bytes H1 and H2.

The output (data region) from the pointer dropping unit 3 is then applied to the cross connect equipment 4. The cross connect equipment 4 achieves a cross connection, under control of the Central Processing Unit (CPU), with respect to the input frame signal multiplexed in plurality channels so that the frame signals for each channel are routed to reach one of the output side transmission lines specified by the CPU. Thus, the input frame signals are given to the pointer inserting unit 5-1 or the pointer inserting unit 5-2 in the case where there are two output side transmission lines (OUT 1, OUT 2).

On the other hand, the frame counter 10 generates timing signals for reconstructing the transport overhead region such as A1, A2 ... H1, H2, J1 ... and so on. The timing signals (A1, A2, H1, H2, J1 ...) are applied to the pointer inserting units 5-1 and 5-2. The timing signal for the byte J1' is applied, as the frame synchronous signal, to the pointer comparating unit 9.

The pointer comparating unit 9 receives both the reception side byte J1 given from the pointer dropping unit 3 and the transmission side byte J1' given from the frame counter 10 so that the phase difference between the two is produced therefrom. The information of the phase difference is supplied to the pointer inserting units 5-1 and 5-2.

At the pointer inserting units 5-1 and 5-2, the position of the byte J1 in the data region of the input frame signal is modified to become the transmission byte J1' in the data region of the output frame signal, according to the aforesaid information of the phase difference.

The output side data having the thus modified byte J1' is added to the transport overhead (A1, A2 ... H1, H2 ...) at frame forming units 6-1 and 6-2 to set up the regulated frame construction as shown in FIG. 2A. The output from the units 6-1 and 6-2 are applied to respective parallel/serial converting units (P/S) 7-1 and 7-2.

At the P/S units 7-1 and 7-2, the frame signals for each channel are multiplexed to become multiplexed serial output signals and are then converted into respective optical signals by electrical/optical converting units (E/O) 8-1 and 8-2 and travel through respective output side transmission lines.

As understood from the above, the pointer is used to perform a phase matching of the multiplexed frame signals.

However, according to the above mentioned prior art pointer processing circuit, the pointer processing cannot be achieved simply but involves complicated processes as explained previously.

Figure 4:
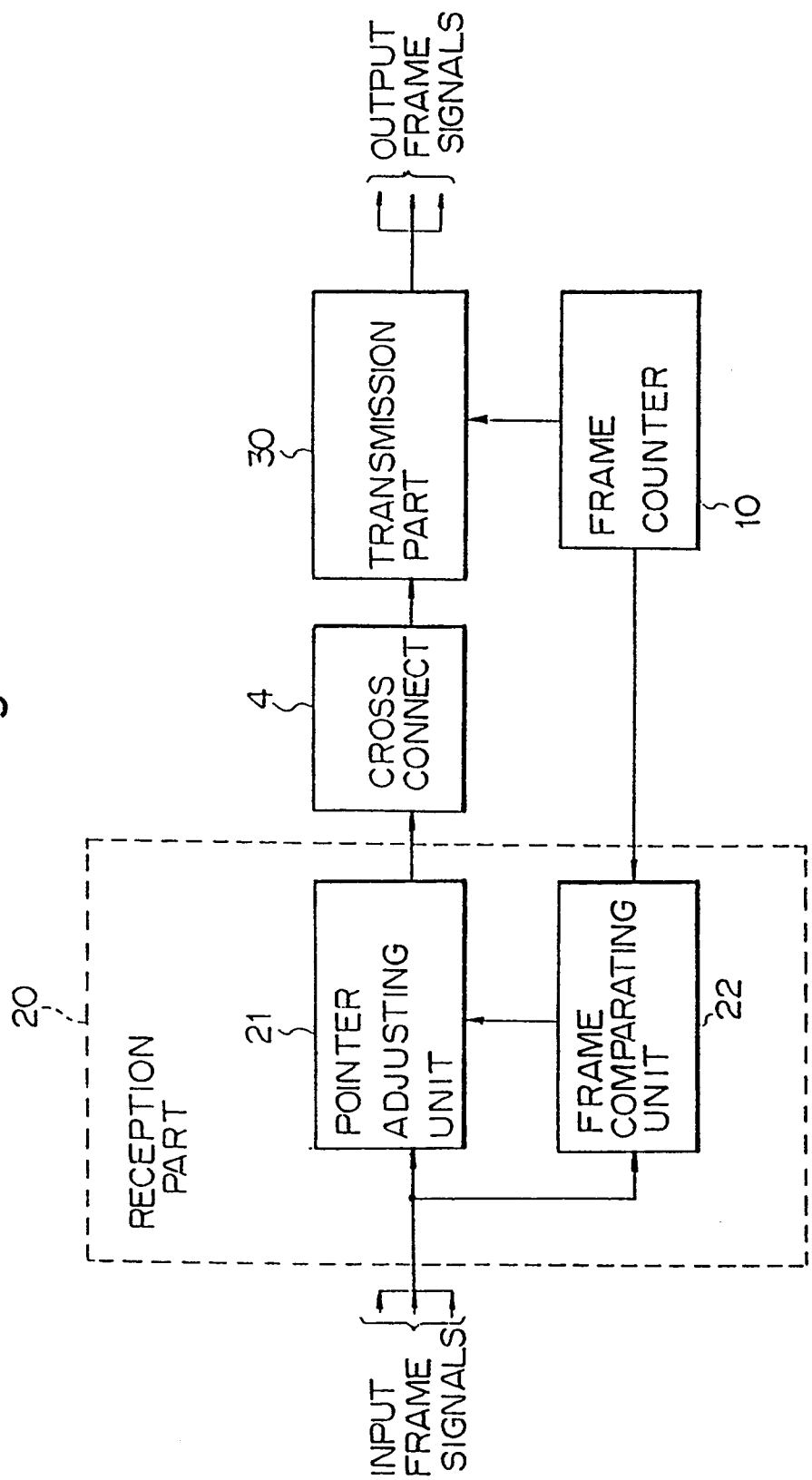
FIG. 4 illustrates a principle block diagram of the pointer processing circuit according to the present invention.

FIG. 4 illustrates a principle block diagram of the pointer processing circuit according to the present invention. In FIG. 4, in general, the pointer processing circuit of the present invention is mounted in a SONET system having a cross connect equipment 4 between a reception part 20 and a transmission part 30. The reception part 20 receives multiplexed input frame signals from a plurality of input side transmission lines and applies them to the cross connect equipment 4 while the transmission part 30 receives cross connected input frame signals, reforms them into signals having a specified frame format and retransmits them as output frame signals to respective output side transmission lines in synchronism with a frame synchronous signal produced by a frame counter 10, wherein the pointer processing circuit is installed in the reception part 20 of the cross connect equipment 4. The pointer processing circuit is operative to detect a phase difference between the input frame signal of each input side transmission line and the frame synchronous signal from the frame counter 10 and adjust the pointer values of each input frame signal based on the thus detected phase difference so that the phase difference is cancelled.

To be more specific, the pointer processing circuit is comprised of pointer adjusting unit 21 and frame comparating unit 22, both provided for each of the input side transmission lines. Each of the frame comparating units 22 produces the phase difference signal between the input frame signal and the frame synchronous signal. Each of the pointer adjusting units 21 receives both the input frame signal and the phase difference signal from the corresponding frame comparating unit 22 to rewrite the pointer value of the thus received input frame signal in accordance with the value of the phase difference given as the phase difference signal.

In the frame comparating unit 22, the frame byte signal, e.g., frame byte A1 (frame signal) is extracted from the input frame signal. On the other hand, the frame synchronous signal from the frame counter 10 is applied to the frame comparating unit 22. The above frame bytes and the frame synchronous signal are applied to the frame comparating unit 22 to produce the phase difference signal between the two. The phase difference signal is then applied to the pointer adjusting unit 21.

Since a fixed positional relationship exists between the frame bytes (A1, A2) and the pointer bytes (H1, H2) as mentioned earlier, it becomes possible to perform the phase matching of the input frame signals by the use of the frame bytes, not by the use of the pointer value as in the prior art (FIG. 1). Accordingly, it becomes possible for the pointer adjusting unit 21 to perform the phase matching of the input frame signal by the use of the frame bytes of the input frame signal and the frame synchronous signal from the frame counter 10.

This means that, in the present invention, when the input frame signals are received, at the reception part 20, from a plurality of the input side transmission lines, the phase difference can be obtained simply by comparing the reception phases of the input side transmission lines. In the prior art, the phase differences are obtained by comparing the reception phases channel by channel for each input side transmission line, which makes the pointer processing complicated.

In short, in the present invention, the phase difference between the transmission (output) frame signal and the reception (input) frame signal is compensated for before the cross connection at the cross connect equipment 4 for each input side transmission line. Contrary to the above, in FIG. 1, the above phase difference is compensated after the cross connection. Therefore, the pointer processing must be achieved for each channel.

Figure 5:
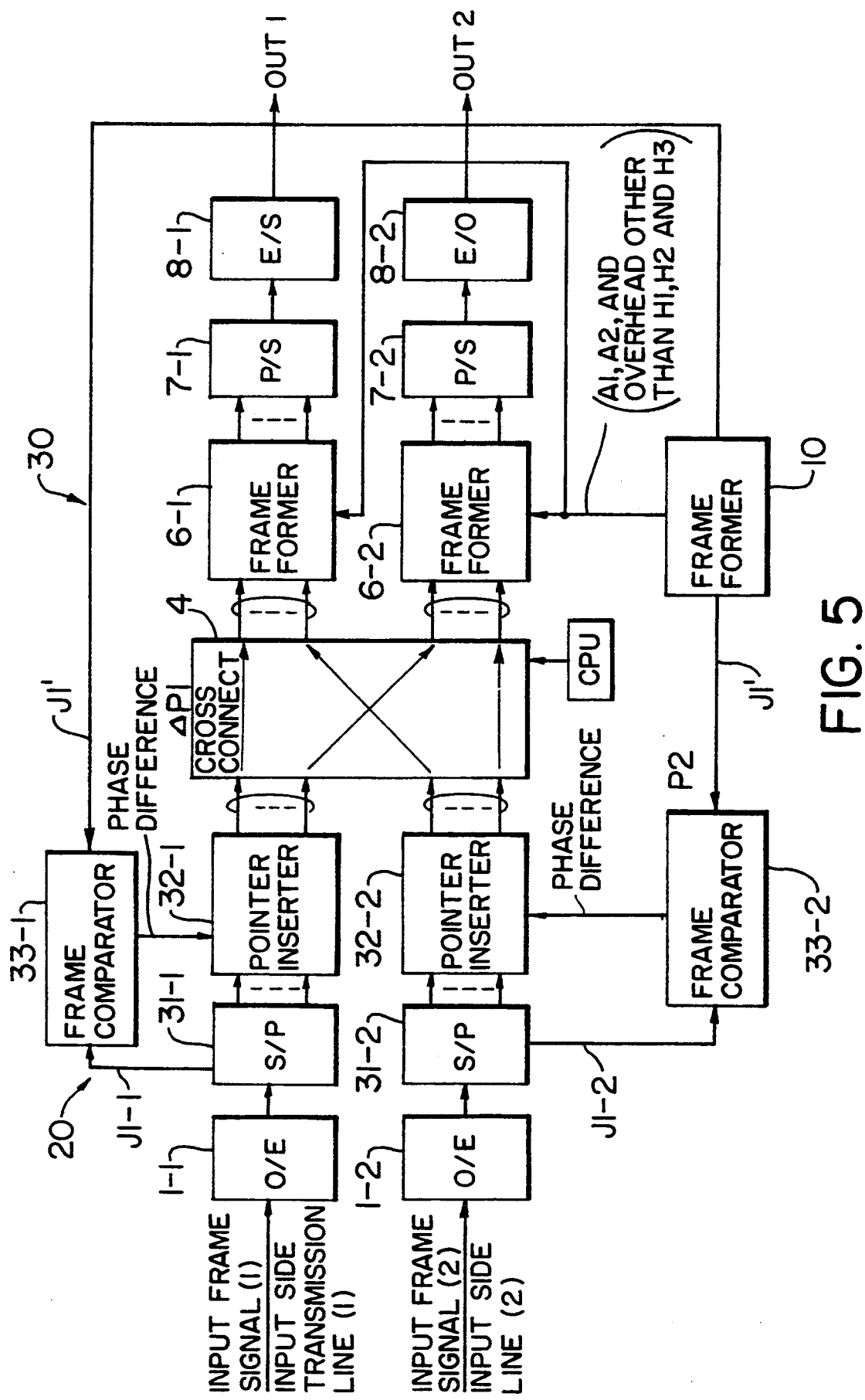
FIG. 5 illustrates an embodiment of the pointer processing circuit according to the present invention.

FIG. 5 illustrates an embodiment of the pointer processing circuit according to the present invention. In FIG. 5, the multiplexed first input frame signal (1) is received from a first input side transmission line (1) and applied to the optical/electrical converting unit (O/E) 1-1. Similarly, the multiplexed second input frame signal (2) is received from a second input side transmission line (2) and applied to the optical/electrical converting unit (O/E) 1-2. In the embodiment, there are two input side transmission lines as an example. Further, each of the first input frame signal (1) and the second input frame signal (2) is a triple multiplexed input frame signal shared by three channels (CH1, CH2, and CH3), as seen in FIG. 6.

Figure 6:
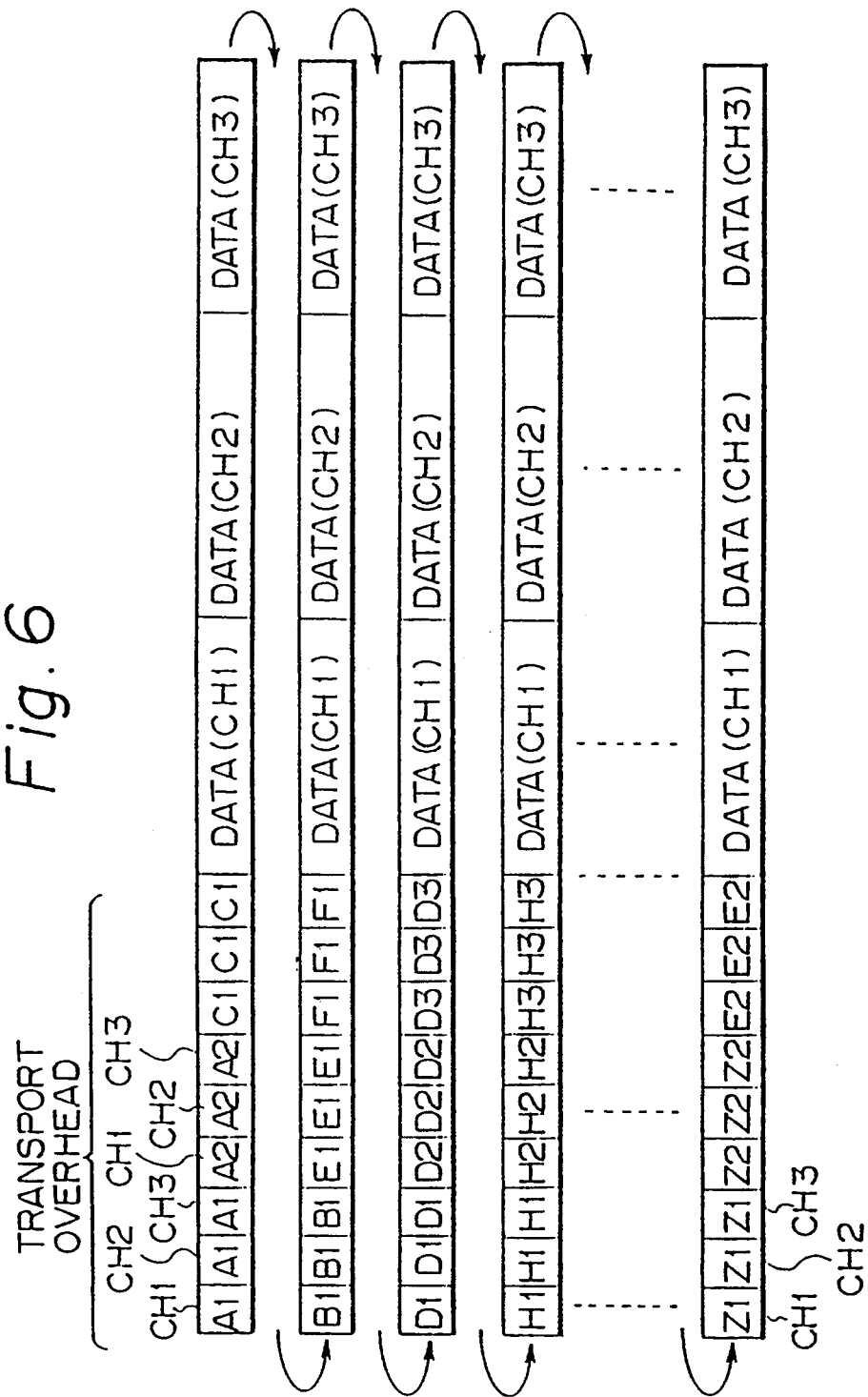
FIG. 6 depicts an example of a triple multiplexed frame structure of an input frame signal shared by three channels.

FIG. 6 depicts an example of a triple multiplexed frame structure of an input frame signal shared by three channels. In FIG. 6, the fifth row to eighth row of FIG. 3 are omitted for simplicity. Three frame bytes A1 for each of the three channels CH1, CH2 and CH3 appear sequentially in this order. This also applies to other bytes as well as the data region.

Returning to FIG. 5, the pointer adjusting unit 21 of FIG. 4 is realized, in the embodiment, by the serial/parallel converters 31-1, 31-2 and pointer inserters 32-1, 32-2 for the first and second input frame signals, respectively. The frame comparating unit 22 of FIG. 4 is comprised, in the embodiment, by frame comparators 33-1 and 33-2 for the first and second frame signals, respectively.

The first and second input frame signals are converted into electrical signals by respective optical/electrical converters (O/E) 1-1 and 1-2 and then applied to the serial/parallel converters (S/P) 31-1 and 31-2, respectively to obtain parallel signals.

Frame synchronization is carried out, in the S/P converters 31-1 and 31-2, by searching, e.g., the frame bytes J1-1 and J1-2 and so on. The thus searched frame signals of the first and second input frame signals (1) and (2) are applied to the frame comparators 33-1 and 33-2. On the other hand, the frame comparators 33-1 and 33-2 are supplied with the output side frame byte signal, e.g., the frame byte J1′ and so on, which frame byte signal is produced by the frame counter 10. The above two frame byte signals are applied to respective frame comparators 33-1 and 33-2 to obtain the phase difference signals ΔP1 and ΔP1, respectively. The signals ΔP1 and ΔP2 are given to the pointer inserters 32-1 and 32-2 which receive, on the other hand, the data signals from the S/P converters 31-1 and 31-2.

The phase difference signals ΔP1 and ΔP2 are used to adjust the pointer values indicating the positions of the bytes J1-1 and J1-2 which are the head positions of the respective data signals.

The data signals having adjusted pointer values are input to the cross connect equipment 4 and cross connected therein, under control of the CPU, by carrying out the time slot exchange of these data signals. The thus cross connected data signals are applied to the routed one of the frame formers 6-1 and 6-2.

In each of the frame formers 6-1 and 6-2, the frame construction of FIG. 2A is rebuilt by combining each cross connected data signal with the corresponding new transport overhead signal (A1, A2 ...), so that the output frame signals are generated. In actuality, the parallel output frame signals are converted into serial signals at parallel/serial converters (P/S) 7-1 and 7-2 and then converted into optical and serial output frame signals at electrical/optical converters (E/O) 8-1 and 8-2 to travel through the main line routes as OUT1 and OUT2.

As understood from the above, the pointer processing can be achieved at the reception part of the cross connect equipment 4. This removes the conventional pointer processing for each channel at the transmission part of the cross connect equipment 4, as is done in the transmission apparatus shown in FIG. 1. This also enables a simplification of hardware handling the pointer processing. Further, it is not necessary to discriminate the originating input side transmission line for each channel data signal as is done in the prior art transmission part of the cross connect equipment. This removes the need for the software used for the above discrimination of the originating input side transmission line.

As mentioned previously with reference to FIG. 5, frame synchronization is carried out in each of the serial/parallel converters 31-1 and 31-2. The frame synchronization circuit will be explained briefly below.

Figure 7:
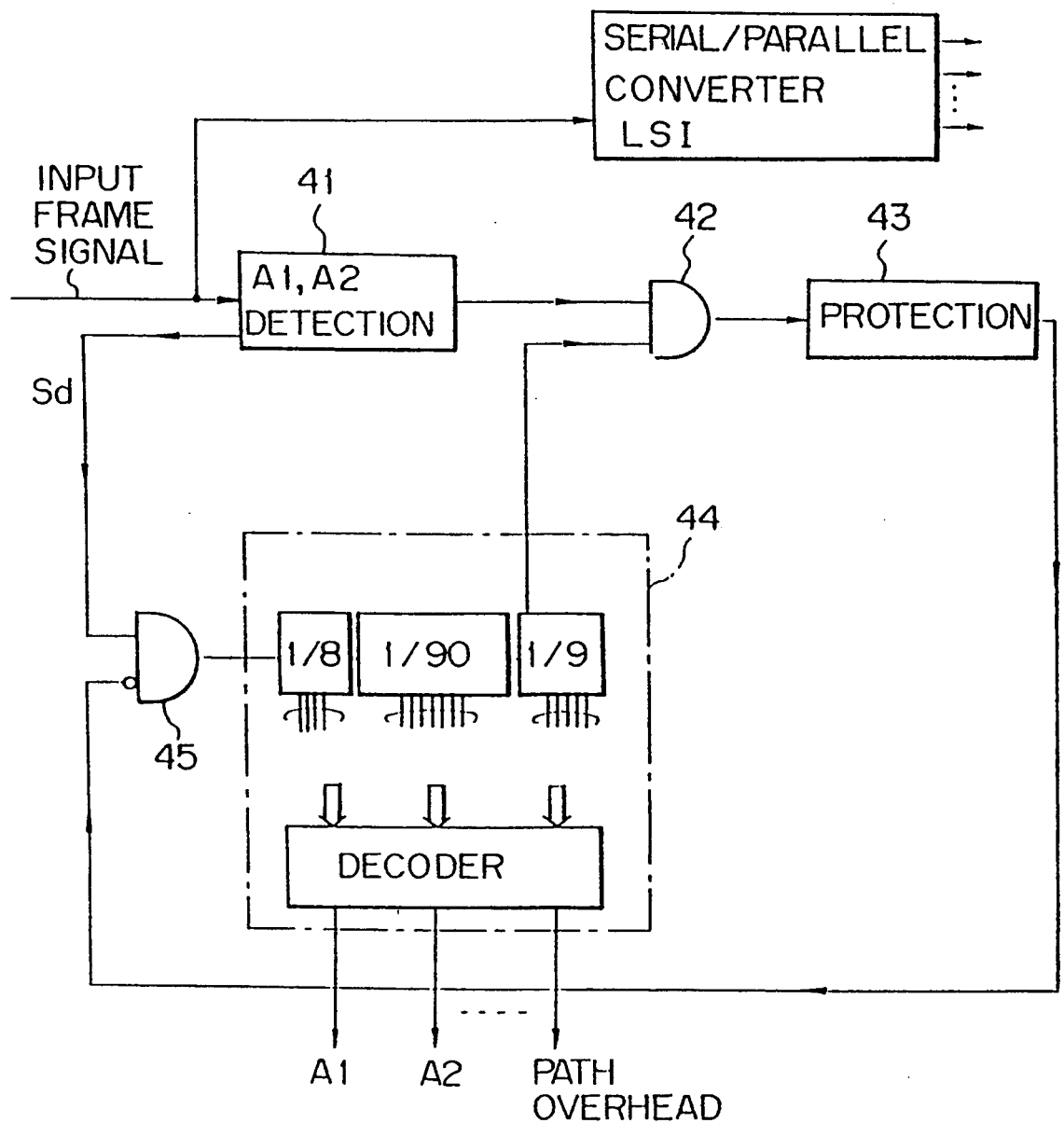
FIG. 7 illustrates an embodiment of the frame synchronization circuit mounted in the serial/parallel converter of FIG. 5.

FIG. 7 illustrates an example of the frame synchronization circuit mounted in the serial/parallel converter of FIG. 5. The circuit of FIG. 7 is commonly mounted in the serial/parallel converters (S/P) 31-1 and 31-2 at their inputs.

The input frame signal is applied to a frame synchronization detecting circuit 41 which detects the bit stream of the frame bytes A1 and A2. The circuit 41 is provided with the bit stream pattern beforehand, so that the circuit 41 produces a detection signal Sd every time a bit stream having the same bit stream pattern appears. However it is not certain whether the thus coincident bit stream contains real bytes A1 and A2. To confirm this, a frame counter 44 is introduced, the frame counter 44 producing the transport overhead bytes (A1, A2 ...) and the path overhead bytes. If the bit stream coincidence is found at a coincidence circuit, i.e., an AND gate 42, the number of the coincidences is counted at a forward and backward protection circuit 43. If the counted number exceeds a predetermined number, a shift circuit, i.e., an AND gate 45 is closed. The shift circuit (45) controls a supply of a basic clock, e.g., 51.84 MHz, or stoppage of the clock. If the real frame bytes A1 and A2 are found, then the shift circuit stops the supply of the basic clock to the frame counter 44.

The frame counter 44 is comprised of a ⅛ divider, 1/90 divider and a 1/9 divider, which correspond to 8 bits of each byte, 90 columns and 9 rows of FIG. 2A, respectively.

Figure 8:
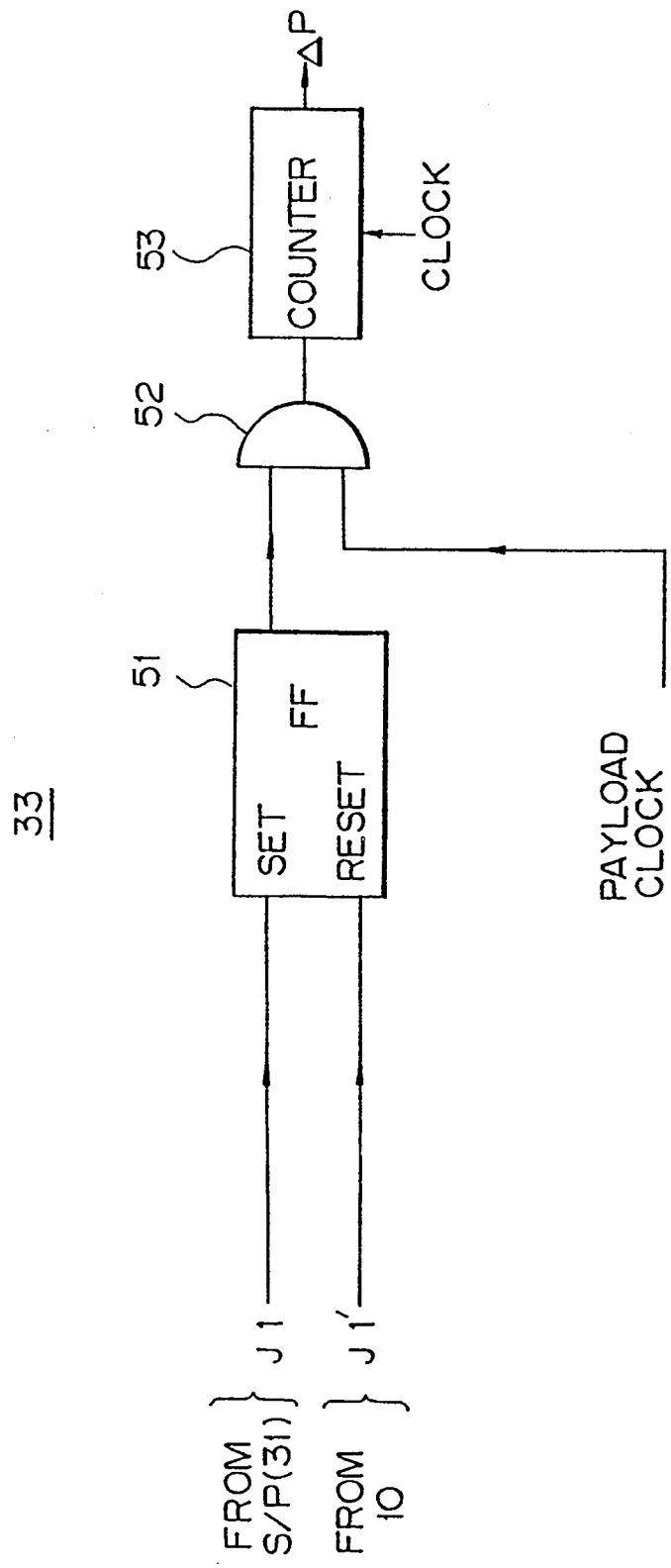
FIG. 8 illustrates an embodiment of the frame comparator of FIG. 5.

FIG. 8 illustrates an example of the frame comparator of FIG. 5. The frame comparator of FIG. 8 is common to the frame comparators 33-1 and 33-2 of FIG. 5. The frame comparator 33 is comprised of a set.reset flip.flop (FF) 51, an AND gate 52 and a counter 53. The flip.flop 51 is set by the input side frame byte signal, such as J1-1 (J1-2) or others given from the frame counter 44 mounted in the serial/parallel converter (31-1, 31-2). The flip-flop 51 is reset by the output side frame byte signal, such as J1′ or others, given from the frame counter 10. Thus the output pulse width of the flip.flop 51 is proportional to the aforesaid phase difference between the reception part and the transmission part of the cross connect equipment 4. The length of the phase difference is measured by the counter 53 via the AND gate 52. The counting operation must be carried out with respect to the data region (see FIG. 2A), i.e., the payload only. Thus a payload clock appearing every 1st byte to 87th byte is applied to the AND gate 52, which payload clock opens the AND gate 52. Thus the phase difference signal ΔP (see ΔP1 and ΔP2 in FIG. 5) is output from the counter 53.

Figure 9:
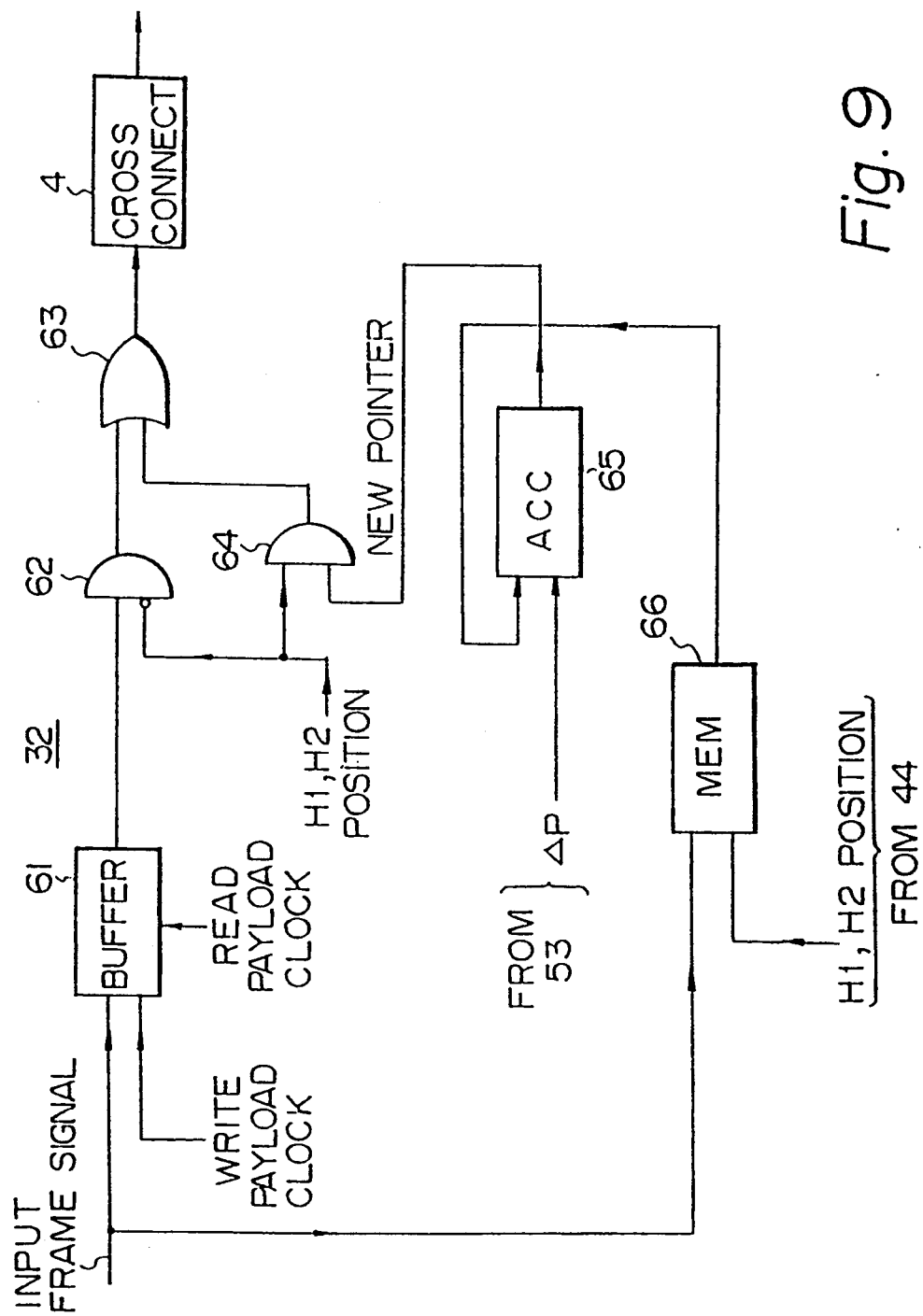
FIG. 9 illustrates an embodiment of a pointer inserter of FIG. 5.

FIG. 9 illustrates an example of a pointer inserter of FIG. 5. The pointer inserter is common to the pointer inserters 32-1 and 32-2 of FIG. 5. The input frame signal is written in a buffer 61 when a write payload clock is received. The write payload clock is extracted from the input frame signal. On the other hand, the frame signal stored in the buffer 61 is read out from the buffer 61 when a read payload clock derived from the basic clock generated in the related transmission apparatus is received. The frame signal from the buffer 61 is input to the cross connect equipment 4 via an AND gate 62 and an OR gate 63. The gate 62 is closed every time the pointer bytes H1 and H2 of the frame signal are applied to the gate 62. Namely, the gate 62 is closed by the pointer byte signal (H1, H2) from the frame counter 44 of FIG. 7. Thus the original pointer bytes H1 and H2 are prevented from being input to the cross connect equipment 4. At this time, the pointer byte signal (H1, H2) is applied to an AND gate 64 to allow the new pointer to reach, through the OR gate 63, the cross connect equipment 4. That is, the pointer bytes H1 and H2 are replaced by the new pointer.

The new pointer is generated by an accumulator (ACC) 65 and a memory (MEM) 66. The accumulator 65 receives, at one input, the phase difference signal ΔP from the frame comparator 33 (FIG. 8) and receives, at the other input, the original pointer value. The phase difference signal ΔP and the original pointer value are added at the accumulator 65 to produce the new pointer.

The original pointer value is given from the memory 66. The memory 66 stores the content of the input frame signal every time the pointer byte signal (H1, H2) is applied to the memory 66. Thus only the original pointer values are extracted and stored in the memory 66.

Figure 10:
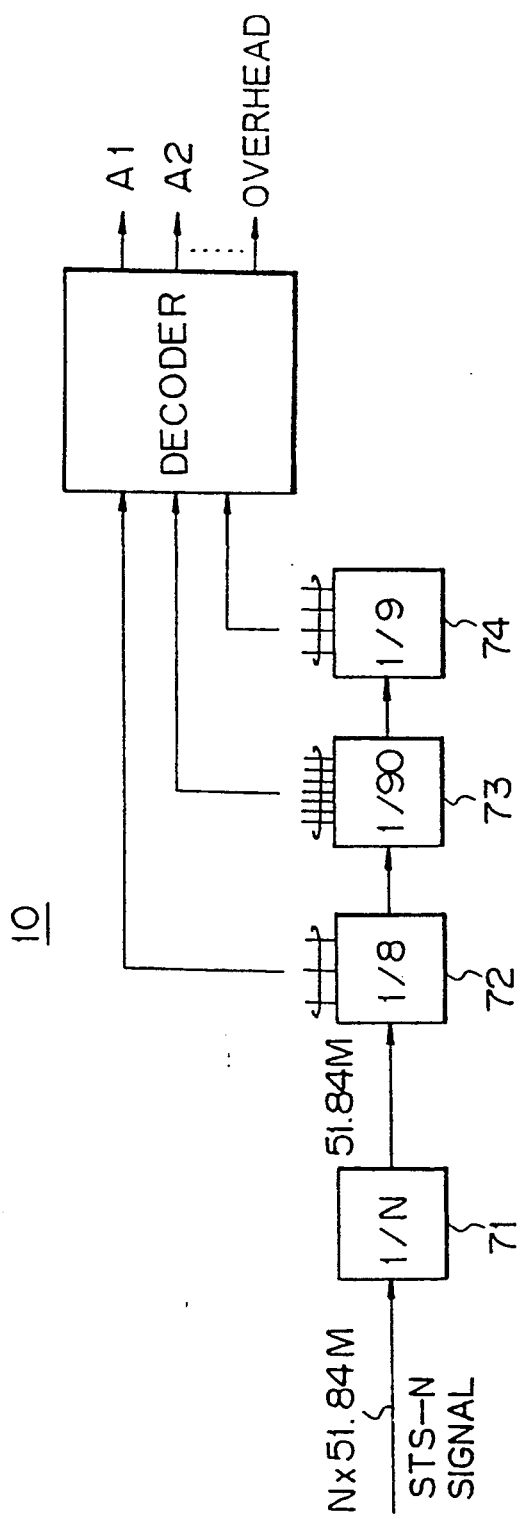
FIG. 10 illustrates an embodiment of the frame counter of FIG. 5.

FIG. 10 illustrates an example of the frame counter of FIG. 5. The frame counter 10 is comprised of a 1/N divider 71, a ⅛ divider 72, a 1/90 divider 73, a 1/9 divider 74 and a decoder 75, as is the frame counter 44 of FIG. 7, to produce respective byte positions of the transport overhead bytes. The 1/N divider 71, where N is a positive integer, divides the basic clock N×51.84 MHz. The number N is three when the frame signal of FIG. 6 is dealt with.

FIG. 11 illustrates an example of the frame foyer of FIG. 5. The frame former of FIG. 11 is common to the frame formers 6-1 and 6-2 of FIG. 5. The frame former 6 is comprised of an AND gate 81, an OR gate 82 and an AND gate 83. The cross connected frame signal from the cross connect equipment 4 is input to the AND gate 81 and the frame signal other than the pointer bytes H1 and H2 is allowed to pass therethrough, since the pointer byte signal (H1, H2) from the frame counter 10 closes the AND gate 81. On the other hand, newly generated overhead bytes other than the pointer bytes H1 and H2 are allowed to pass through the gates 83 and 82 to become the output frame signal together with the frame signal passed through the AND gate 81.

As explained above in detail, the pointer processing circuit of the present invention can simply carry out the pointer processing operation with relatively simple hardware.

I claim:

1. A pointer processing circuit in combination with a cross connect equipment in a SONET transmission system which has said cross connect equipment between a reception part and a transmission part, and a frame counter connected to said pointer processing circuit and producing a frame synchronous signal, wherein said reception part receives input frame signals from a plurality of input side transmission lines and applies said input frame signals to said cross connect equipment while said transmission part is provided with cross connected input frame signals from the cross connect equipment, reforms said cross connected frame signals into signals having a specified frame format and retransmits said signals as output frame signals to respective output side transmission lines in synchronism with said frame synchronous signal produced by said frame counter, the pointer processing circuit being installed in said reception part at said cross connect equipment so that pointer processing of said frame signals is carried out for every input side transmission line and each input frame signal has a pointer value before cross connection thereof, said pointer processing circuit comprising means to detect a phase difference between said input frame signal of each of said input side transmission lines and said frame synchronous signal from said frame counter and adjust the pointer value of said input frame signal for each of said input side transmission lines based on the thus detected phase difference signal so that the phase difference is cancelled.

2. A pointer processing circuit as set forth in claim 1, wherein said pointer processing circuit is comprised of a pointer adjusting unit and a frame comparating unit, both provided for each of said input side transmission lines, each of frame comparating units producing said phase difference between said input frame signal and said frame synchronous signal and each of pointer adjusting units receiving both said input frame signal and the phase difference signal from the corresponding frame comparating unit to adjust the pointer value of the thus received input frame signal in accordance with the value of said phase difference given as said phase difference signal.

3. A pointer processing circuit as set forth in claim 2, wherein each of said pointer adjusting units is comprised of a serial/parallel converter and a pointer inserter connected in series, said serial/parallel converter receives said input frame signal to achieve first a frame synchronization for the received input frame signal to generate a frame byte signal and then obtains a parallel frame signal, and said pointer inserter receives the parallel frame signal to adjust said pointer value, based on said phase difference signal, to input said pointer value to said cross connect equipment.

4. A pointer processing circuit as set forth in claim 3, wherein each of said frame comparating units is comprised of a frame comparator which receives said frame byte signal generated through said frame synchronization in said serial/parallel converter and also receives an output side frame byte signal, as said frame synchronous signal produced by said frame counter to produce said phase difference signal therefrom.

5. A pointer processing circuit as set forth in claim 4, wherein said frame comparator includes a flip-flop, an AND gate and a counter, connected in series in this order, said flip-flop receiving and being set by said frame byte signal from said serial/parallel converter and receiving and being reset by said output side frame byte signal from said frame counter and producing a resultant output which is applied to one of inputs of said AND gate which receives, at another input thereof, a payload clock given at every data signal transmission timing in each said frame signal, and said counter counting said payload clock passing through said AND gate.

6. A pointer processing circuit as set forth in claim 5, wherein said pointer inserter includes a buffer which receives said input frame signal to be written therein in accordance with a write payload clock supplied to said buffer, and outputs the written input frame signal therefrom in accordance with a read payload clock also supplied to said buffer in synchronism with a basic clock of said transmission system, a memory means which extracts an original pointer value from said input frame signal at the byte position of pointer bytes H1 and H2 and stores the original pointer value therein, an accumulator which adds said phase difference signal from said frame comparator with said original pointer value from said memory means to produce an adjusted pointer value according to said phase difference, and a gate means which allows the read frame signal from said buffer except for the pointer bytes to pass therethrough to said cross connect equipment and allows said adjusted pointer value from said accumulator to pass therethrough at every pointer byte position to said cross connect equipment.

7. A pointer processing circuit as set forth in claim 4, wherein said cross connect equipment is provided with a plurality of frame formers at an output thereof, each of said frame formers comprising a gate means which is operative to selectively insert a new overhead signal into the cross connected data signal output from said cross connect equipment at every point byte position specified by said frame counter to produce said output frame signals.

8. A pointer processing circuit as set forth in claim 7, wherein said frame counter includes at least a ⅛ divider receiving a basic clock of said transmission system, a 1/90 divider and 1/9 divider, connected in series in this order, and a decoder connected to and receiving output bits of said dividers, respectively, to produce overhead byte positions to said frame former.

* * * * *